US012688535B2

(12) United States Patent
    Cohen et al.

(10) Patent No.: US 12,688,535 B2
(45) Date of Patent: ***Jul. 21, 2026

(54) SELF-OPTIMIZING, MULTI-CHANNEL, COGNITIVE DIGITAL INSURANCE RATE QUOTING, COMPARISON SHOPPING AND ENROLLMENT SYSTEM AND METHOD

(71) Applicant: PATTY, LLC, Deerfield Beach, FL (US)

(72) Inventors: Seth Cohen, Lighthouse, FL (US); Luis Silvestre, Miramar, FL (US)

(73) Assignee: PATTY, LLC, Deerfield Beach, FL (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/131,098

(22) Filed: Apr. 5, 2023

(65) Prior Publication Data

US 2023/0342860 A1     Oct. 26, 2023

Related U.S. Application Data

(63) Continuation-in-part of application No. 16/983,862, filed on Aug. 3, 2020, now Pat. No. 11,645,720.

(Continued)

(51) Int. Cl.
    *G06Q 40/00*          (2023.01)
    *G06F 3/16*           (2006.01)
    (Continued)

(52) U.S. Cl.
    CPC ............. *G06Q 40/08* (2013.01); *G06F 3/167* (2013.01); *G06Q 30/0246* (2013.01);
    (Continued)

(58) Field of Classification Search
    CPC .............. G06Q 40/08; G06Q 30/0277; G06Q 30/0282; G06F 40/35; G06F 40/30; G06N 5/042; G06N 20/00; G06N 3/006
    See application file for complete search history.

(56) References Cited

U.S. PATENT DOCUMENTS 9,495,700 B2    11/2016    Hoch et al.
9,652,805 B1     5/2017    Clawson, II et al.
(Continued)

FOREIGN PATENT DOCUMENTS

CA      2979627         3/2018
WO      WO-2019032994 A1 *    2/2019    ............. G06F 40/56
WO      WO-2020072443 A1 *    4/2020    ............. G09B 5/12

OTHER PUBLICATIONS

Feine et al: "Measuring Service Encounter Satisfaction with Customer Service Chatbots using Sentiment Analysis", Proceedings of the 14th International Conference on Wirtschaftsinformatik (WI2019), Siegen, Germany, (Year: Feb. 24-27, 2019).*

(Continued)

*Primary Examiner* — Edward J Baird
(74) *Attorney, Agent, or Firm* — Cozen O'Connor

(57)          ABSTRACT

A performance internet marketing self-optimizing, anthropomorphic, artificial intelligence-based system and method to quote, compare and purchase products from a provider, including personal lines insurance, commercial lines insurance, property insurance and casualty insurance. The system and method collects information from an online advertising platform during the process and returns the collected information to the online advertising platform for improvement of the online advertising platform.

7 Claims, 5 Drawing Sheets

10

11 -    | User enters search terms in online optimized advertising platform |

12-     | If entered search terms match to system pre-defined search terms, optimized online advertising platform displays link to connect with cognitive virtual assistant |

Related U.S. Application Data

(60) Provisional application No. 62/930,171, filed on Nov. 4, 2019, provisional application No. 62/891,777, filed on Aug. 26, 2019, provisional application No. 62/887,962, filed on Aug. 16, 2019, provisional application No. 62/886,393, filed on Aug. 14, 2019, provisional application No. 62/881,706, filed on Aug. 1, 2019.

(51) Int. Cl.

| | |
|---|---|
| *G06Q 30/0242* | (2023.01) |
| *G06Q 40/08* | (2012.01) |
| *G10L 15/18* | (2013.01) |
| *G10L 15/22* | (2006.01) |
| *G06Q 30/0251* | (2023.01) |

(52) U.S. Cl.
CPC .......... *G10L 15/1822* (2013.01); *G10L 15/22* (2013.01); *G06Q 30/0256* (2013.01)

(56) References Cited

U.S. PATENT DOCUMENTS

| | | | | |
|---|---|---|---|---|
| 10,332,297 | B1 | 6/2019 | Vadodaria | |
| 10,347,241 | B1 | 7/2019 | Meng et al. | |
| 10,460,392 | B1 | 10/2019 | Etheridge et al. | |
| 10,586,369 | B1 | 3/2020 | Roche et al. | |
| 10,630,840 | B1 * | 4/2020 | Karp ................... | H04M 3/5235 |
| 2005/0134935 | A1 | 6/2005 | Schmidtler et al. | |
| 2007/0250769 | A1 | 10/2007 | Bass et al. | |
| 2011/0313834 | A1 | 12/2011 | Jain | |
| 2012/0046975 | A1 | 2/2012 | Stolze | |
| 2013/0275210 | A1 * | 10/2013 | Johnson ............. | G06Q 30/0277 705/14.48 |
| 2014/0032246 | A1 | 1/2014 | Bhatt et al. | |
| 2014/0304011 | A1 * | 10/2014 | Yager .................... | G06Q 40/02 705/4 |
| 2015/0073907 | A1 * | 3/2015 | Purves ................ | G06Q 20/384 705/14.58 |
| 2015/0249747 | A1 * | 9/2015 | Boss ....................... | H04M 3/56 379/85 |
| 2016/0246966 | A1 | 8/2016 | Batrouni | |
| 2016/0334230 | A1 | 11/2016 | Ross et al. | |
| 2017/0206604 | A1 * | 7/2017 | Al-Masoud ............ | G06Q 40/08 |
| 2017/0278117 | A1 * | 9/2017 | Wallace ............. | G06Q 30/0271 |
| 2018/0082683 | A1 * | 3/2018 | Chen ................... | G06F 21/6263 |
| 2018/0189857 | A1 | 7/2018 | Wu et al. | |
| 2018/0191884 | A1 | 7/2018 | Goldgraber et al. | |
| 2018/0285978 | A1 * | 10/2018 | Groarke ................ | G06Q 40/08 |
| 2018/0342095 | A1 * | 11/2018 | Walsh .................... | G06F 3/017 |
| 2019/0026364 | A1 * | 1/2019 | Sankovsky ........ | G06Q 30/0207 |
| 2019/0108547 | A1 | 4/2019 | Baker, III et al. | |
| 2019/0121808 | A1 * | 4/2019 | Chadha .............. | G06F 16/2365 |
| 2019/0205727 | A1 | 7/2019 | Lin et al. | |
| 2019/0220773 | A1 | 7/2019 | Terry et al. | |
| 2019/0332400 | A1 * | 10/2019 | Spoor .................... | G06F 3/013 |
| 2020/0020165 | A1 | 1/2020 | Tran | |
| 2020/0111201 | A1 | 4/2020 | Kuruvilla et al. | |
| 2020/0193264 | A1 * | 6/2020 | Zavesky ............... | G06N 20/00 |
| 2021/0035153 | A1 * | 2/2021 | Cohen ................... | G06Q 40/08 |

OTHER PUBLICATIONS

Oser et al: "Guided Digital Cognitive Behavioral Program for Anxiety in Primary Care: Propensity-Matched Controlled Trial", JMIR Mental Health, vol. 6, No. 4, Published Apr. 4, 2019 (Year: 2019).*

* cited by examiner

<u>10</u>

11 -    User enters search terms in online optimized advertising platform

12-    If entered search terms match to system pre-defined search terms, optimized online advertising platform displays link to connect with cognitive virtual assistant

32

10

33 -  System collects information from online advertising platform and cognitive digital assistant 34-  Return collected information to online advertising platform for updating optimization

SELF-OPTIMIZING, MULTI-CHANNEL, COGNITIVE DIGITAL INSURANCE RATE QUOTING, COMPARISON SHOPPING AND ENROLLMENT SYSTEM AND METHOD

BACKGROUND OF THE INVENTION

Field of the Invention

The present invention relates to a performance internet marketing self-optimizing, anthropomorphic, artificial intelligence-based system and method to quote, compare and purchase personal lines and commercial lines property and casualty insurance or life and health insurance, or benefits products and services (hereinafter "benefits products") from an insurance benefits provider, benefits company, healthcare discount plan provider, health care sharing ministry, or similar entities (hereinafter "benefits provider(s)") through a cognitive virtual process via phone, mobile device, tablet, app, SMS, chat, iMessage, videoconference, or virtual reality (hereinafter "method(s) of communication"). For example, products can include personal lines policies such as auto, boat, motorcycle, and recreational vehicles, pet insurance, travel, accident, home, renters or apartments, condominium or townhouse, umbrella, inland marine, flood insurance; commercial lines policies such as business owner, abuse or molestation, fidelity, cybersecurity; and related products including, for example, life and annuity products.

Description of the Related Art

The property and casualty benefits product industry has changed and there is potential for disruption. Customers have easy online access to competitive rate information and options in the shopping and servicing of their policies. Often products are tied directly to other shopping events such as buying a home or automobile. For example, Carvana.com, an online used car and financing website, has changed the approach to the sale of used automobiles, including some limited forms of coverage on cars purchased from them. The conventional path to purchase insurance has transformed with the advent of technology, smartphones and digital assistants. Many benefits product purchases are made in conjunction with other purchases leveraging information and need at the point another product such as, equipment, property automobile or boat is purchased. Easy seamless ways of leveraging the point of sale information at these transactions and allowing the customer to comparison shop and have questions answered immediately through the media of their choice has become common in the marketplace.

Consumers expect and demand convenience, speed, automation and simplicity. Any unnecessary additional effort, incremental steps or inconvenience that leads the consumers to abandon their purchase journey is defined as 'friction'. Friction may occur offline or online, and includes subjecting consumers to unnecessarily wait, queue, click, type, tap, add information or fill-in forms. The consumers may also have to load, buffer, switch channels/windows or hold for service. It can hinder efficiency and impact the consumer experience, adversely affecting the consumer purchase journey.

Consumers of products commonly use comparison shopping internet websites to research and compare available options. Products comparison shopping websites attempt to guide consumers through intricate product variations from multiple providers. A state of asymmetric information for products across the individual marketplace exists and potentially leads the consumer to adverse selection.

Due to the nature of the chaotic environment, the individual marketplace is also an outlet for fraudulent products. In many cases, consumers seek the assistance of a licensed insurance agent, producer or broker (hereinafter "agent") to select a product. It is common in the individual marketplace for a consumer to speak with an agent by phone to review available product options and complete the provider's enrollment process. The agent typically enters the consumer's underwriting details into a rate quoting calculator or web form to obtain rates, explains the differences between plan options from various benefits providers, and transcribes the enrollment details onto the provider's application or enrollment portal on behalf of the consumer.

In many cases, the agent is appointed to represent a limited number of providers thus limiting the consumer's choices to only plans offered by those providers. Compensation arrangements for insurance agents also typically include commissions (a percentage of premium as paid by the provider) or another form of compensation (e.g., marketing fees). Agent bias, thus, is also potentially a significant factor in adverse selection.

Conventional systems have been used for extracting user data to identify available insurance plans based on responses from the consumer. U.S. Pat. No. 9,495,700 describes the use of branded virtual characters on a server computer which are accessed by an employee at a remote client computer over a network in order to engage and educate users regarding alternate benefit plans. Throughout the process, the system employs a portfolio-driven approach to identify inter-dependencies among different benefit products and plans and prioritize and recommend "portfolio-level" benefit solutions. The employee can be automatically enrolled in the selected benefit plan. This system has the drawback of needing a computer interface to access the system over the internet and can be cumbersome for a person to navigate, especially the elderly or unsophisticated computer users.

It is desirable to provide an unbiased, anthropomorphic, artificial intelligence-based telephonic system and method to identify the consumer's available product options based on eligibility, assist in the comparison of different options, automatically enroll the consumer into selected plans available from various insurers, and self-optimize the online performance marketing campaign for referring the consumer to the system.

SUMMARY OF THE INVENTION

The present invention relates to an anthropomorphic, artificial intelligence-based system to optimize real-time marketing spend using historical performance data and real time buying signals and to drive consumers to the action of quoting, comparing, and purchasing personal lines and commercial lines property and casualty insurance in real time. For example, products can include personal lines policies such as auto, boat, motorcycle, and recreational vehicles, pet insurance, travel, accident, home, renters or apartments, condominium or townhouse, umbrella, inland marine, flood insurance; commercial lines policies such as business owner, abuse or molestation, fidelity, cybersecurity; and related products including, for example, life and annuity products. The process of real time optimization can use an application programming interface ("API") to relay critical performance metrics from a cognitive virtual assistant to online advertising platforms. The online advertising platforms can be search engines, such as for example, Google Adwords, Microsoft Bing, & Yahoo Gemini. Search engines are online advertising platforms that offer advertisers the ability to purchase an ad listing which prompts the consumer to visit a website or call a phone number if the consumer types a specified search query. In addition, real-time optimization of referring search marketing campaigns occurs via API by relaying critical performance metrics from the cognitive virtual assistant to an online third-party search engine or lead aggregator bidding platforms. In one embodiment, the online bidding platform uses a ping post method to allow a lead seller to send partial information, the "ping", of a lead to their network of lead buyers. The buyer then determines whether he or she would like to purchase the lead based on this information and obtains contact information from the seller via the "post."

Search engines often display multiple advertisers' ads for the same search query and give full control to the advertiser over the search queries they choose to display their ads on. The ad position for each unique search query is determined primarily by a maximum cost-per-click ("CPC") which dictates the highest amount that an advertiser is willing to spend for a click on a website advertisement or a phone call. In addition to specifying a max CPC for each keyword query, the advertiser is also given tools to increase or decrease their max CPC based upon demographics of the consumer, such as for example gender, age, household income, parental status, and location along with environmental factors, such as for example time of day and day of week. Every unique ad listing a search engine displays to a consumer takes the above factors into consideration to determine a final ad position.

In the present invention, if the consumer chooses to click through via an ad listing of the advertiser, a click tracking identification (ID) is generated by the search engine which is unique to the consumer's click. The click tracking ID can be linked back to the consumer whether they choose to complete an insurance application online or call in from the website and complete an application over the phone.

In the present invention, the process of optimization can use an API from the cognitive virtual assistant to deliver a status of the application back to the search engine using a status tracking ID generated by the search engine. By delivering the performance data, such as for example successful applications, from the cognitive virtual assistant to the search engine, real time performance of each unique keyword query on an application level can be determined along with performance factors, such as gender, age, household income, parental status, and location, along with environmental factors, such as time of day and day of the week. The system can make real time, automatic optimization using the search engines' API to control max CPC and demographic-specific bids based upon current application performance to, in turn, optimize marketing spend and drive future applications automatically.

In the present invention, the process of optimization can use an application programming interface (API) from the cognitive virtual assistant to deliver a status of the application back to the search engine using a status tracking identification (ID) generated by the search engine. By delivering the performance data, such as for example, successful applications from the cognitive virtual assistant to the search engine, real time performance of each unique keyword query on an application level can be determined along with performance factors, such as for example, for a VIN number, license plate, state, and number of miles, and for homeowners products the address, zip code, type of dwelling, age of home, type of construction, and square footage. In similar fashion, the appropriate metadata can be collected for pet insurance, life and annuity products, mobile cellular, live TV, and streaming services. In all cases, environmental factors can be collected, such as, for example, time of day and day of week.

The user (a buyer, consumer, or system herein referred to as "user") initiates a session via various methods of communication. In one embodiment, a session is initiated by a user using one of the selected methods of communication. For voice sessions, audio interfaces of the system allow multi-language bidirectional speech-based conversations between the cognitive virtual assistant and the user. As the user speaks to the cognitive assistant, the process of automated speech recognition (ASR) digitally converts audible speech into transcribed text.

Through natural language processing, including sentiment and tone analysis, the system evaluates the meaning and context of the transcribed text and adjusts the language and tone of the cognitive virtual assistant's responses accordingly to accommodate the user. Context-switching capability of the system allows the user to interrupt and restart any embedded process while retaining the user's information. The system can include anepisodic memory to allow the cognitive virtual assistant to recall details from previous segments of the current conversation or previous conversations altogether. The cognitive virtual assistant can be implemented in a conversational manner for receiving information from a user and generating responses using cognitive learning abilities during the conversation. The cognitive learning abilities of the cognitive virtual assistant can also include analytic memory for understanding trend of data, affective memory for understanding emotion and deep back projection networks ("DBPN") for learning process flows via empirical learning. The cognitive virtual assistant can be considered to be a "trusted" virtual producer for the user as compared to a human motivated to make any sale.

Once a session is initiated, the user is introduced to the cognitive virtual assistant trained to generate rate quotes, compare available options, and enroll the consumer into selected plans available from various insurers. The cognitive virtual assistant follows a roadmap embedded in a semantic memory for guiding the user through the session. It allows the cognitive virtual assistant to engage in conversation with the user while restricting the conversation to insurance rate quoting, comparison shopping and enrollment topics and processes. In some embodiments, the user can be referred to the cognitive virtual assistant by an internet search engine, social media ad, or other internet-based performance marketing platforms. The cognitive virtual assistant captures the user's referral metadata including referring website URL, search phrase or ad clicked, geolocation, internet protocol ("IP") address, and other values for analytics and optimization.

In one embodiment, once a session is initiated, the user is introduced to a cognitive virtual assistant trained to generate rate quotes, compare available products options, and enroll the consumer into selected plans available from various insurers. The cognitive virtual assistant follows a roadmap embedded in the system's semantic memory for guiding the user through the session. It allows the virtual assistant to engage in conversation with the user while restricting the conversation to insurance rate quoting, comparison shopping and enrollment topics and processes.

In one embodiment, once a session is initiated, the user is introduced to the cognitive virtual assistant trained to generate rate quotes, prices and packages, compare available coverage options, and enroll the consumer into selected plans available from various benefits providers. The cognitive virtual assistant follows a roadmap embedded in a semantic memory for guiding the user through the session. It allows the cognitive virtual assistant to engage in conversation with the user while restricting the conversation to benefits product options, pricing, comparison shopping and enrollment topics and processes. In some embodiments, the user can be referred to the cognitive virtual assistant by an internet search engine, social media ad, or other internet-based performance marketing platforms. The system captures the user's referral metadata including referring website URL, search phrase or ad clicked, geolocation, Internet Protocol (IP) address, and other values for analytics and optimization. Once a session is initiated, the user is introduced to a cognitive virtual assistant trained to generate rate quotes, compare available coverage options, and enroll the consumer into selected plans available from various providers.

The cognitive virtual assistant can prompt the user to answer a series of pre-qualifying questions to determine available product and service options. In one embodiment, in order to generate a quote for an individual to list rates and details for coverage options for one proposed insured, the cognitive virtual assistant can request the following information from the user for auto a VIN number, license plate, state, and number of miles, and for homeowners an address, zip code, type of dwelling, age of home, type of construction, and square footage. In an alternate embodiment, the appropriate metadata can be collected for pet insurance, life and annuity products. Responses from the user are stored in memory of the system. The system can invoke an application programming interface (API) to connect to one or more third-party provider quoting servers to obtain available plan or pricing options from the providers for the consumer. Responses from the one or more providers' rate quoting servers can contain quoting details, including, for example, plan descriptions, premiums and coverage areas, tiered options, or limitations. The cognitive virtual assistant can review the received responses and relay the received responses or a subset of the received responses to the user by voice, text, or email at the user's preference. The system can utilize underwriting guidelines from insurers together with user stated preferences, eligibility and affordability to sort and highlight recommended coverage options to the user.

The user can select one or more products or services from the provider's options and proceed to purchase or enroll for the selected option(s) including new, upgraded, or transferring of service. The one or more product can be selected by specifying the one or more product names or one or more unique identifiers to the cognitive virtual assistant. Once the one or more options are selected, the system can invoke an API call to one or more third-party provider's application servers to obtain application requirements for the selected product options. The cognitive virtual assistant prompts the user to provide information directed to the application requirements for the selected product option. Responses from the user can be stored in memory while collecting information from the user for each data field required on the application for the selected option. Upon satisfaction of the application requirements for the selected options, the system invokes an API call to one or more third-party provider's enrollment servers corresponding to the one or more third party provider's application servers to submit the enrollment, application or purchase and obtain a policy identification (ID) or confirmation of submission or purchase information. It will be appreciated that in some embodiments the third-party provider's application server can be the same server as the third-party provider's enrollment server. The response from the third-party enrollment server can contain additional fulfillment material from the provider for the user to be insured. The system can relay the additional fulfillment material to the user by various methods of communication, at the user's preference. The cognitive virtual assistant can also present cross-sell opportunities to the user.

In one embodiment, upon completion of the enrollment process, the system invokes an API call to a referring third-party internet marketing ad campaign server to report conversion details for the originating search phrase or ad clicked. The system periodically calculates ad-level conversion metrics and initiates an automated audience selection ("AAS") process. The AAS process calibrates an associated marketing campaign's scheduled geographic exposure and spending parameters via the API to regulate traffic and conversion cost. The system can provide security of the user interface and transmitted data. In one embodiment, data encryption can be used during transport of data.

The invention will be more fully described by reference to the following drawings.

DETAILED DESCRIPTION

Figure 1A:
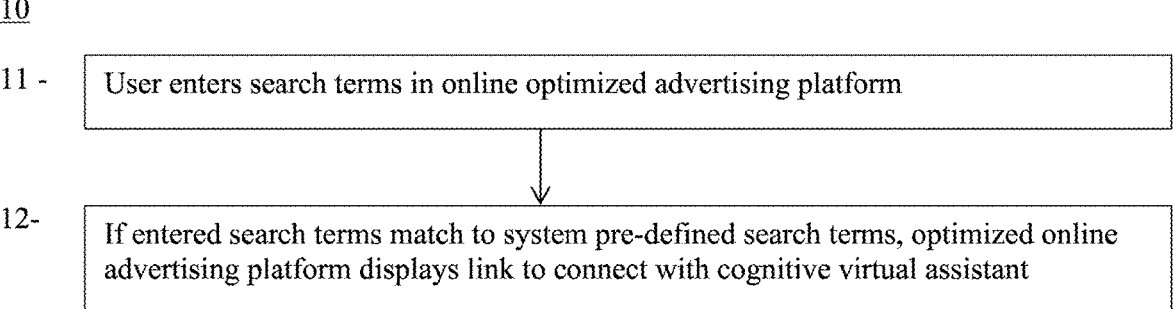
FIGS. 1A-1D are flow diagrams of one embodiment of a method for pre-qualifying a consumer, interactively collecting information for optimization of online advertising platforms and presenting relevant product options based on eligibility to the user, presenting the user with a selection of determined product options, and enrolling a qualified consumer in the user's selected product option(s) as performed by a system of the present invention.
Figure 1B:
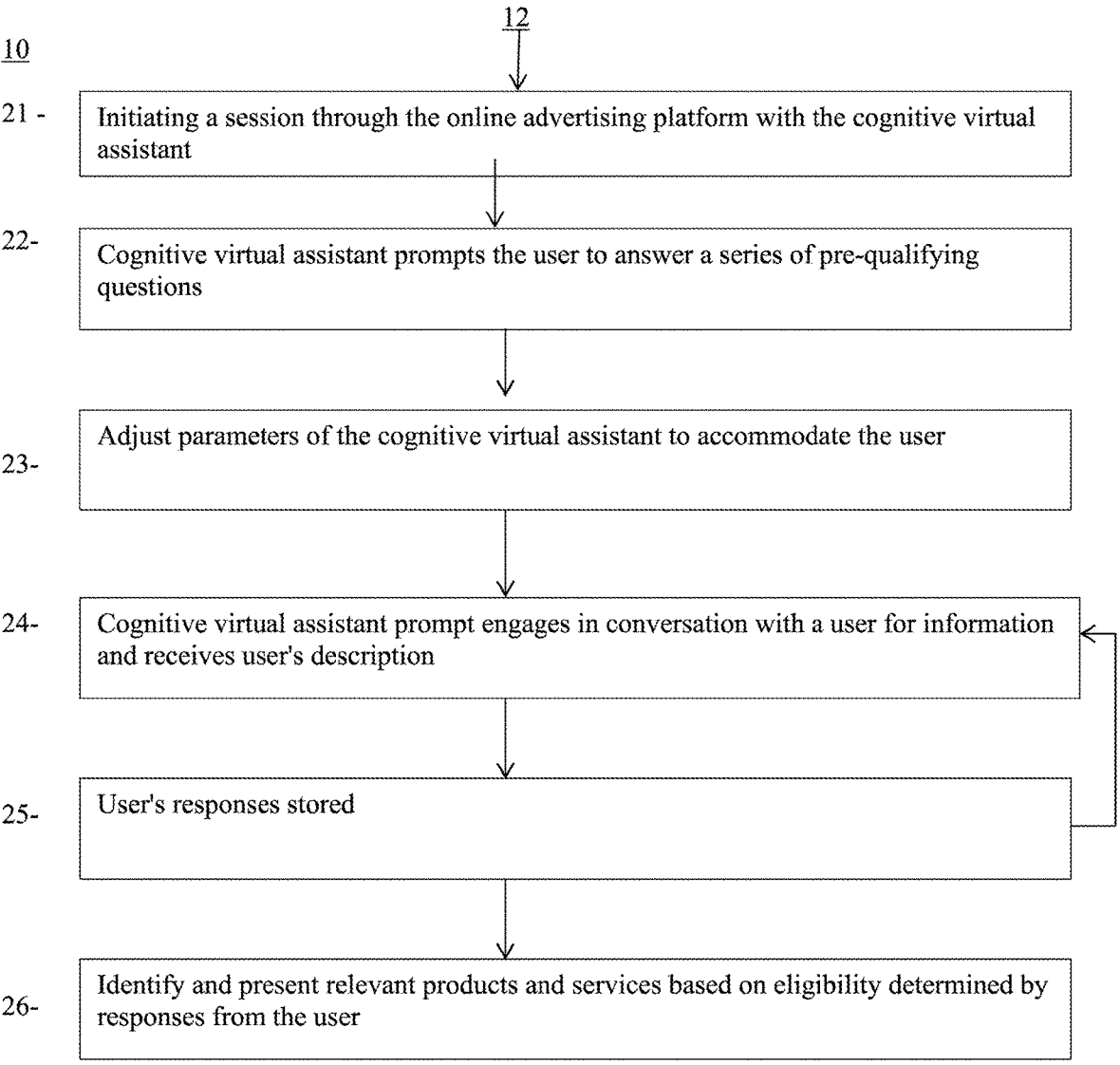
Figure 1C:
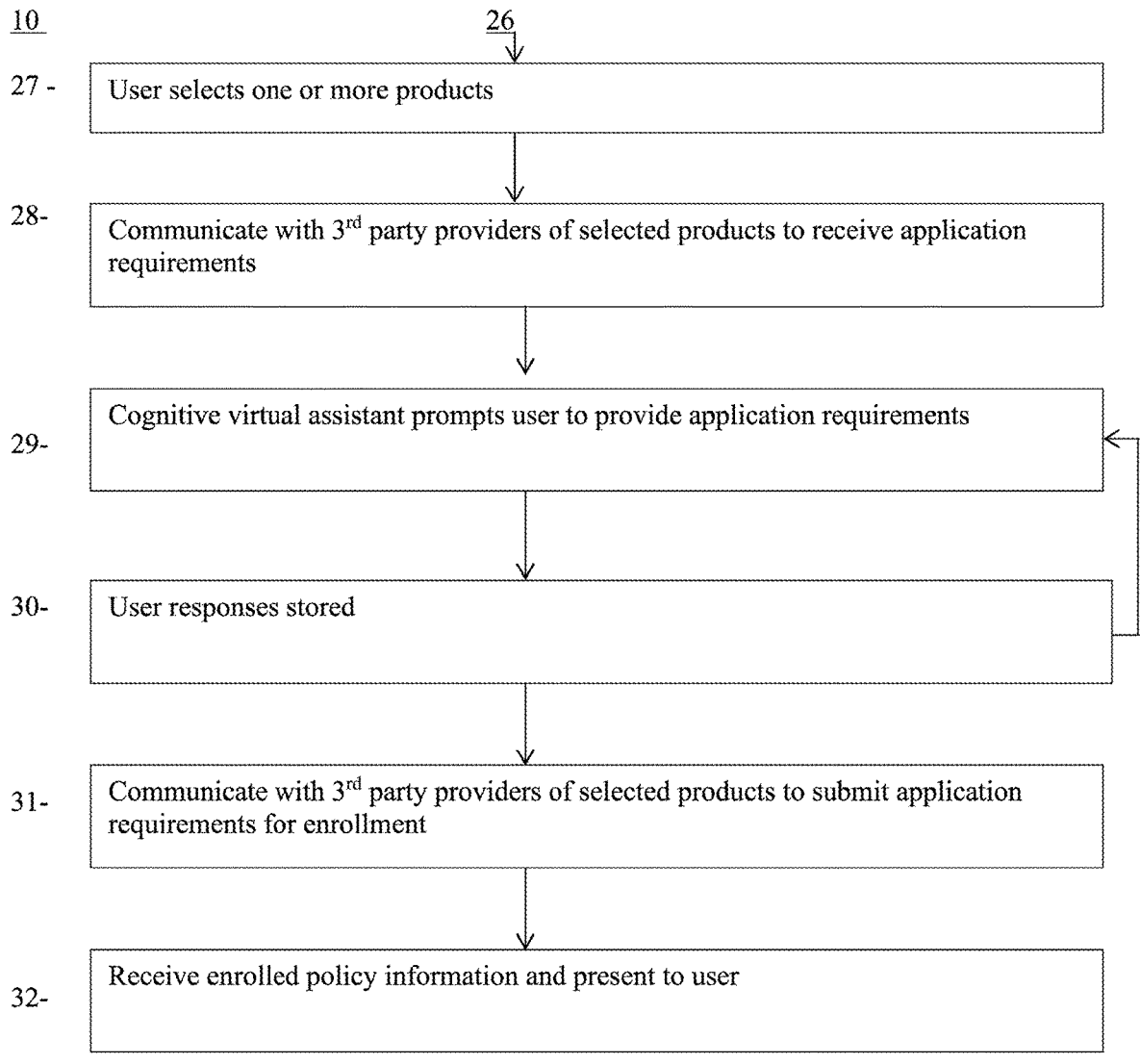
Figure 1D:
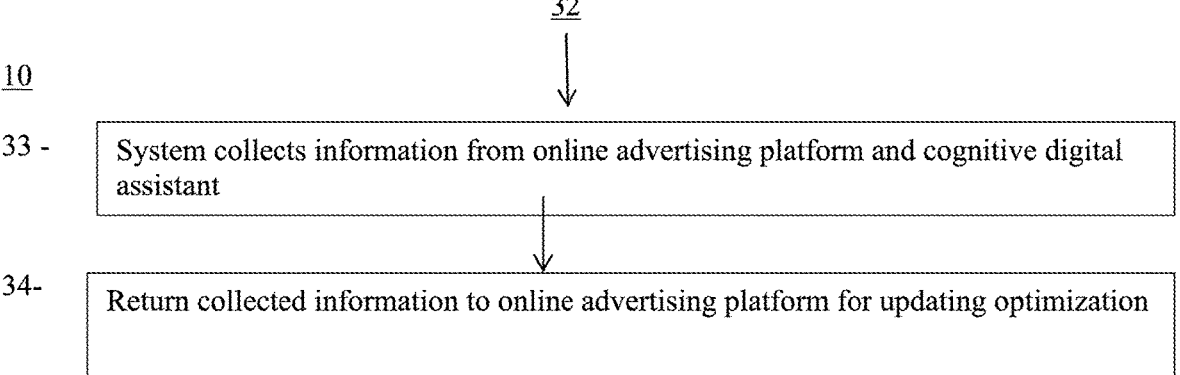

Reference will now be made in greater detail to a preferred embodiment of the invention, an example of which is illustrated in the accompanying drawings. Wherever possible, the same reference numerals will be used throughout the drawings and the description to refer to the same or like parts.

As used in this application, the terms "component", "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

FIGS. 1A-1D are flow diagrams of an embodiment of interactive method 10 for interactively collecting information for optimization of online advertising platforms, presenting one or more relevant benefits product options based on eligibility to the user, and enrolling of the user with determined benefits product options.

In step 11, a user enters one or more search terms in an optimized online advertising platform. The optimized online advertising platform can be a search engine, such as for example, Google Adwords, Microsoft Bing, & Yahoo Gemini. Alternatively, the optimized online advertising platform can include online third-party lead aggregator bidding platform. The online advertising platform can be optimized using historical performance data and real time performance metrics collected from the user with a cognitive virtual assistant as discussed below.

In step 12, if the one or more entered search terms match system pre-defined search terms the optimized online advertising platform displays a link to connect with a cognitive virtual assistant. The pre-defined search terms can relate to search phrases for products such as, for example "affordable auto insurance", "affordable homeowners insurance", "cell service", for high-speed Internet service "transfer service from one address to another," "upgrade service," or other appropriate search parameters for pet, life or annuity insurance or other home services. An example link to connect to the cognitive virtual assistant can be in the form of establishing a telephone call with the cognitive virtual assistant. Alternatively, the link can be an associated number of the cognitive virtual assistant which can be used by the user to establish a call with the cognitive virtual assistant.

In step 21, a session with a cognitive virtual assistant is initiated from the link provided by the online advertising platform. The user can be a buyer or consumer or system. For example, the user can initiate the session with the system using an interface of various methods of communication. For example, the user can initiate the session with the system using an interface of a phone, mobile device, tablet, app, wearable computer device, SMS, chat, iMessage, videoconference, virtual reality, game or game system. Once a session is initiated, in step 21, the user is introduced to a cognitive virtual assistant. The cognitive virtual assistant can greet and prompt the user to answer a series of pre-qualifying questions in step 22. In one embodiment, the system can internalize the user's answers and not repeat questions which limits buyer or consumer frustration. For a voice session, audio interfaces of the system allow multi-language bidirectional speech-based conversations between the cognitive virtual assistant and the user. As the user speaks to the cognitive virtual assistant, a process of automated speech recognition ("ASR") can digitally convert received audible speech into transcribed text. Through natural language processing, including sentiment and tone analysis, the system evaluates the meaning and context of the transcribed text and adjusts the language and tone of responses from the cognitive virtual assistant accordingly to accommodate the user. The context-switching capability of the system allows the user to interrupt and restart any embedded process while retaining the user's information. The system's episodic memory allows the assistant to recall details from previous segments of the current conversation or previous conversations altogether. The cognitive virtual assistant can be implemented in a conversational manner for receiving information from a user and generating responses using cognitive learning abilities during the conversation. In one embodiment, the cognitive virtual assistant presents audio to the user and receives audio from the user. The cognitive virtual assistant is able to receive voice responses via an audio interface which is transferred to a server to be interpreted with artificial intelligence in real time. Responses from the server can be sent back via audio to the user's audio interface In step 23, during the session between the user and the cognitive virtual assistant, the system can adjust parameters of the cognitive virtual assistant to accommodate the user. For example, language and tone of the cognitive virtual assistant can be selected or adjusted. The cognitive virtual assistant can utilize commercial technologies including for example sentiment analysis, tone analyzer and personality insights to adjust parameters of the cognitive virtual assistant.

In step 24, the cognitive virtual assistant engages in conversation to prompt the user to provide information and describe the product options which are of interest to the user for purchase. In one embodiment, the cognitive virtual assistant can request the following information from the user such as, for example, a VIN number, license plate, state, number of miles, an address, zip code, type of dwelling, age of home, type of construction, and square footage. The cognitive virtual assistant can request appropriate metadata be collected for any of the products the user is considering. In step 25, responses from the user are stored in memory of the system. Step 24 and step 25 can be repeated for collecting additional information from the user directed to desired options.

In step 26, relevant one or more products of one or more third-party providers are identified to the user through the cognitive virtual assistant based on eligibility determined by responses from the user to the cognitive virtual assistant. In one embodiment, the system can invoke an API to call to one or more third-party insurance rate quoting servers to obtain available options from third-party providers for the quoted insured. Responses from the one or more provider's rate quoting servers can contain rate quoting details, including, for example, plan descriptions, premiums and limitations. In one embodiment, the system can invoke an application programming interface (API) to call to one or more third-party provider rate quoting servers to obtain available coverage options from third-party providers for the quoted product(s). Responses from the one or more benefit provider rate quoting servers can contain rate quoting details, including, for example, plan descriptions, and premiums, limitations. The cognitive virtual assistant can review the received responses and present the received responses or a subset of the received responses to the user by various methods of communication, at the user's preference. The system can utilize underwriting guidelines from providers together with user stated preferences, eligibility and affordability to sort and highlight recommended options to the user.

In step 27, the user can select one or more options of products. The products can include one or more plans which can be selected by the user specifying one or more plan names or one or more unique identifiers to the cognitive virtual assistant. The use can select options to quote, compare, purchase, upgrade, and transfer products from one address to another.

In step 28, the system can communicate with one or more third-party providers of one or more selected products to receive application requirements. In one embodiment, the system can invoke an API call to an application server of the one or more third-party providers to obtain application requirements for the selected options.

In step 29, the cognitive virtual assistant prompts the user to provide information directed to the application requirements for the selected option. In step 30, responses from the user can be stored in memory. Step 29 and step 30 can be repeated for collecting information from the user for each data field required on the application for the selected option. The system can review the collected information to ensure that application requirements for the selected options are satisfied. If the application requirements are not satisfied, steps 29 and 30 can be repeated.

In step 31, the system communicates with one or more third party providers of selected products to submit application requirements for enrollment. In one embodiment, the system invokes an API call to an enrollment server of the one or more third-party providers corresponding to an application server of the selected one or more third-party providers to submit the application and obtain a policy or plan ID. In one embodiment, the virtual assistant automatically transfers the user to the selected provider for enrollment. In step 32, the system c an receive enrolled policy or plan information and presents the received information to the user through the cognitive virtual assistant. The response from the enrollment server of the one or more third-party providers can contain additional fulfillment material from the third-party provider. The system can relay the additional fulfillment material to the user by various methods of communication, at the user's preference. The received policy or plan information can be presented to the user by the cognitive virtual assistant.

In step 33, the system collects information from the internet online advertising platform and the cognitive virtual assistant for analytics and optimization. The information can also be collected during one or more previously described steps of method 10. The collected information from the cognitive virtual assistant can include, for example, for an automobile policy, a VIN number, license plate, state, and number of miles, and for a homeowners policy an address, zip code, type of dwelling, age of home, type of construction, and square footage, and premium paid by the user. The collected information from the cognitive virtual assistant can include appropriate metadata for pet insurance, life and annuity products. The collected information from the advertising platform can include the search phrase originally keyed in by the user, and metadata including for example, referring website URL, ad clicked, geolocation, and internet protocol (IP) address.

In step 34, collected information is returned to the online advertising platform for updating optimization. In one embodiment, the optimization includes optimizing ad position for each unique search query to increase or decrease a max cost-per-click (CPC) based upon demographics of the consumer, such as for example, for auto a VIN number, license plate, state, and number of miles, for homeowners an address, zip code, type of dwelling, age of home, type of construction, and square footage. In similar fashion, the appropriate metadata can be collected for pet insurance, life and annuity products.

In one embodiment, the collected information includes tracking user clicks using the online advertising platform. The optimization uses information of whether the consumer chooses to click through an ad listing of the advertiser to generate a click tracking identification (ID) by the online advertising platform which is unique to the consumer's click. The click tracking ID can be linked back to the consumer whether they choose to complete a product application online or call in from the website and complete an application over the phone using the cognitive virtual assistant.

The process of optimization can use an API from a customer relationship management (CRM) of an application of the provider to deliver a status of the application back to the online advertising platform using a status tracking identification (ID) generated by the online advertising platform.

Figure 2:
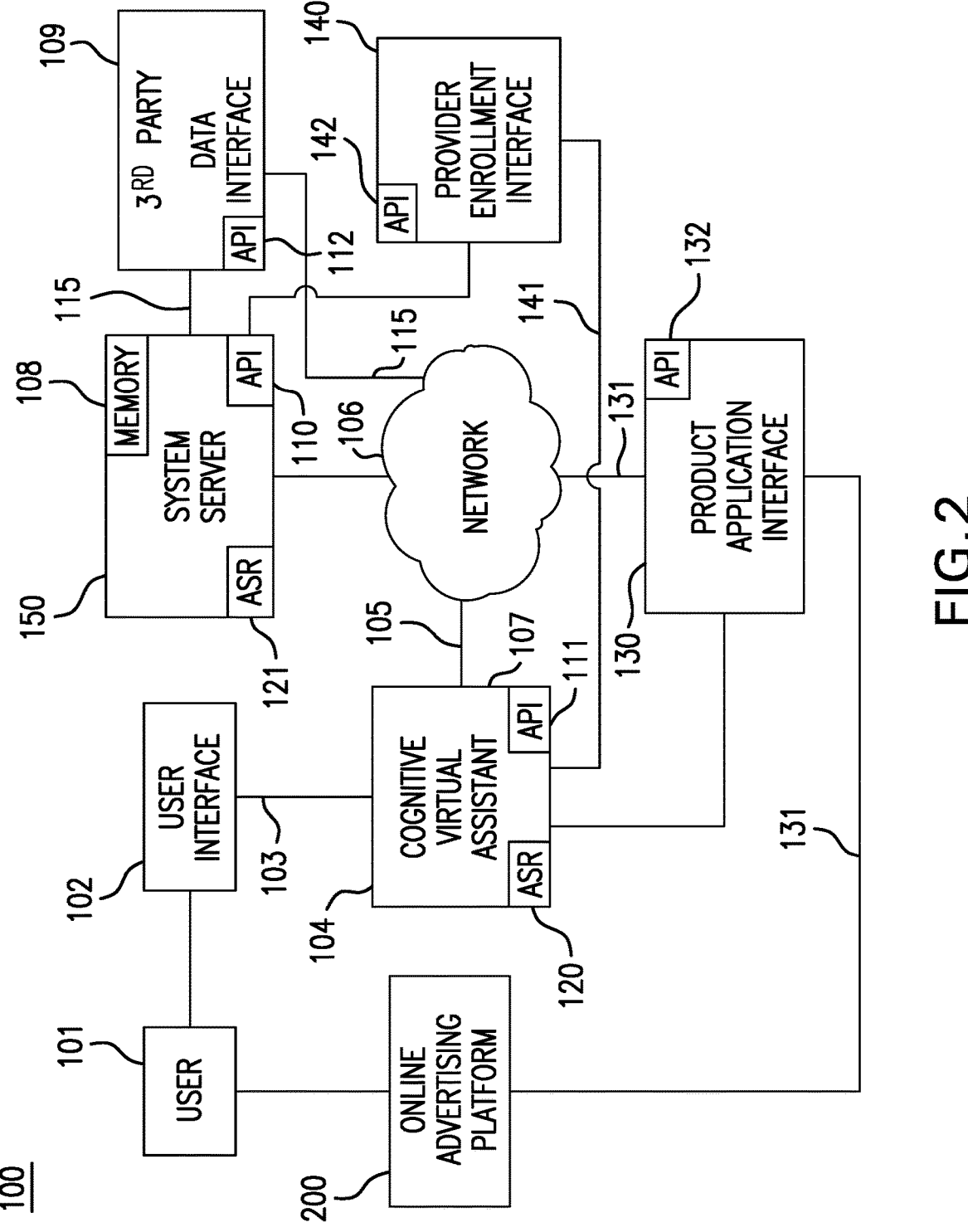
FIG. 2 is a block diagram of an embodiment of an artificial intelligence-based multi-channel system of the present invention.

FIG. 2 is a schematic diagram of an implementation of system 100. System 100 communicates with online advertising platform 200. Online advertising platform receives search terms from user 101 and communicates information to user 101. In one embodiment, online advertising platform 200 communicates a link to cognitive virtual assistant 104 or provides a number to call cognitive virtual assistant 104 or initiates a call with cognitive virtual assistant 104.

System 100 includes user interface 102 which is accessed by user 101. User interface 102 can be an electronic device such as a mobile telephony device including for example a mobile device, cell phone or smartphone. User interface 102 can include SMS, chat, mobile app, or Messenger. Mobile telephony devices can communicate with fourth generation (4G) or fifth generation (5G) cellular communications. It will be appreciated that other mobile telephony devices and networks can be used in accordance with the teachings of the present invention. User interface 102 communicates audio or digital information to cognitive virtual assistant 104 over communication path 103.

Cognitive virtual assistant 104 can be a component which is artificial intelligence based. In one embodiment, cognitive virtual assistant receives audio over communication path 103. Audio can be digitized or interpreted by cognitive virtual assistant 104 into data 105. In one embodiment automated speech recognition (ASR) 120 can be performed at cognitive virtual assistant 104 or automated speech recognition (ASR) 121 can be performed at system server 108 to digitally convert received audible speech into transcribed text. Cognitive virtual assistant 104 can utilize commercial technologies including for example sentiment analysis, tone analyzer and personality insights to analyze data and adjust parameters. Cognitive virtual assistant 104 can be implemented in a natural language conversational manner for receiving information from user 101 and automatically generating responses to user 101 during the conversation. Cognitive virtual assistant 104 can have cognitive learning abilities. Cognitive virtual assistant 104 can include natural language processing and context switching. Cognitive virtual assistant 104 can include semantic memory, episodic memory for learning from past conversations, analytic memory for understanding trend of data, affective memory for understanding emotion and deep back projection networks (DBPN) for learning process flows via empirical learning. In some embodiments, the part of speech of content of the utterance of cognitive virtual assistant 104 is determined based on using a natural language parser (e.g., Stanford Natural Language Processing Group software or others as are known in the art) to parse the utterance. The part of speech of content of the utterance can indicate if the content is a noun phrase, verb phrase, and/or theme. In some embodiments, the type of speech of content of the utterance of cognitive virtual assistant 104 is determined based on using a natural language parser (e.g., Stanford Natural Language Processing Group software or others as are known in the art) to parse the utterance. Virtual assistant 104 using artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The type of speech of content of the utterance can indicate if the content is a noun phrase, verb phrase, and/or theme. In some embodiments, the domain of the content of the utterance of cognitive virtual assistant 104 is determined based on pattern matching. Cognitive virtual assistant 104 can include components such as a processor, memory, storage, microphone, learning module, and operating system. An example, cognitive virtual assistant or virtual producer is described in U.S. Pat. No. 9,812,151 hereby incorporated by reference into this application.

Data 105 is transferred over communication path 107 to network 106. Network 106 communicates with system server 108. For example, network 106 can be the Internet. Cognitive virtual assistant 104 may include a server, computer, laptop, PC, mobile device, or the like that includes a processor, a memory, and a communication device. Cognitive virtual assistant 104 and system server 108 may include a plurality of computing devices connected together, e.g., via a network. The processor may include any general purpose or application-specific processor. The memory may include one or more tangible, non-transitory, machine-readable media.

System server 108 accesses third-party data interface 109. For example, third-party data interface 109 can be an interface to a third-party system for accessing third-party rate quote data. For example, system server 108 can access third-party data 115 directly from databases of third-party providers. In one embodiment, API 110 of system server 108 or API 111 of cognitive virtual assistant 104 communicates with API 112 of third-party data interface 109 to access the features or data from third-party data interface 109. Alternatively, system server 108 can access third-party data 115 over network 106. For example, third-party data 115 can include For example, third party data 115 can include third party rate quoting services and carrier specific underwriting guidelines, pricing and requirements from multiple providers for personal lines insurance, commercial lines insurance, property insurance and casualty insurance. In some embodiments, third party data 115 can include data directed to: personal lines policies such as for example auto, boat, motorcycle, recreational vehicles, pet insurance, travel, accident, home, renters, apartments, condominium, townhouse, umbrella, inland marine, and flood insurance. In some embodiments third party data 115 can include data directed to commercial lines policies, such as for example business owner, abuse or molestation, fidelity, cybersecurity. In some embodiments, third party data 115 can include data directed to life and annuity and specific underwriting guidelines and requirements.

System server 108 or cognitive virtual assistant 104 can connect to product application interfaces 130. For example, the product application interface 130 can be an interface to one or more third-party systems of providers for accessing data 131. Data 131 can be application enrollment, or purchase requirements data. In one embodiment, API 110 of system server 108 or API 111 of cognitive virtual assistant 104 communicates with API 132 of product application interface 130 to access features of products or data 131 from products application interface 130. Alternatively, system server 108 can access data 131 over network 106. For example, data 131 can include application enrollment, or purchase requirements data fields of an application relating to user information.

System server 108 or cognitive virtual assistant 104 can connect to provider enrollment interface 140. For example, provider enrollment interface 140 can be an interface to one or more third-party systems for accessing enrollment data 141. In one embodiment, API 110 of system server 108 or API 111 of cognitive virtual assistant 104 communicates with API 142 of s provider enrollment interface 140 to access the features or data from of provider enrollment interface 140. Alternatively, system server 108 can access enrollment data 141 over network 106. For example, enrollment data 131 can include policy and identification data and fulfillment data. In one embodiment, provider enrollment interface 140 can send enrollment data 131 directly to user 101 through user interface 102 by a chosen method of communication. Data 105, third-party data 115, 131 and enrollment data 141 can be stored in memory 150 of system server 108. Information collected from cognitive virtual assistant 104 can be forwarded from API 111 to online advertising platform 200 for analytics and optimization. Enrollment data 131 can be forwarded from API 132 to online advertising platform 200. In one embodiment, API 110, API 111, API 112, API 132 and API 142 are web based APIs.

Embodiments of the present invention can be implemented in connection with a special purpose or general purpose computer device that includes both hardware and/or software components, including special purpose or general purpose computers.

Embodiments can also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A computer-implemented method for presenting products for enrollment to a user and facilitating user-interactive advertising optimization, the method comprising:

initiating, by a product enrollment system that includes a cognitive virtual assistant, a communication session with a user via a communications interface with a user interface of the user, the user interface having been directed to the product enrollment system by an online advertising platform;

receiving, by the product enrollment system, via the communications interface, language input from the user interface during the communication session;

associating, by the product enrollment system, the communication session with an interaction between the user and the online advertising platform based on a click-tracking ID;

interpreting the language input, by the product enrollment system using artificial intelligence, including analyzing sentiment and tone, recalling details from previous segments of the communication session or a previous communication session with the user from episodic memory, and generating user data as a result of the interpreting;

determining, by the product enrollment system, user-specific parameters based on the user data;

generating, by the product enrollment system, user-specific responses that are based on the user-specific parameters;

dynamically adjusting, by the product enrollment system, the user-specific responses and reducing repetition and latency in user interactions during the communication session based on the analyzing of the sentiment and tone, and on the recalling of the details from previous segments of the communication session or a previous communication session with the user;

communicating, by the product enrollment system, the user-specific responses to the user interface during the communication session;

dynamically adjusting, by the product enrollment system, the user-specific parameters based on the sentiment and tone analysis responsive to language choice, tone, pacing, and level of detail of the user data;

prompting the user interface, by the product enrollment system during the communication session, for information from the user relevant to one or more products for enrollment;

receiving, by the product enrollment system via one or more provider application interfaces, product data from an application server of one or more providers of the one or more products for enrollment;

determining, by the product enrollment system, eligibility of the user for enrollment in the one or more products for enrollment based on the user data and the product data;

presenting, by the product enrollment system, the one or more products for enrollment for which the eligibility for enrollment was determined, to the user interface during the communication session;

prompting the user via the user interface, by the product enrollment system, to provide information corresponding to application requirements of the one or more products for enrollment;

producing, by the product enrollment system, completed application requirements based on the information corresponding to application requirements of the one or more products for enrollment;

communicating, by the product enrollment system, the completed application requirements to a respective at least one provider of products for enrollment;

communicating, by the product enrollment system, application status information and at least a portion of the information corresponding to application requirements to the online advertising platform, the communicating being in association with the interaction between the user and the online advertising platform based on a status-tracking ID that is distinct from the click-tracking ID.

2. The method of claim 1 wherein prompting the user to provide information corresponding to application requirements of the one or more products for enrollment includes prompting the user to answer one or more pre-qualifying questions, and wherein the determining of the relevant products for enrollment is based on eligibility of the user according to answers to the one or more pre-qualifying questions.

3. The method of claim 1 wherein initiating the communication session is in response to the online advertising program matching one or more user search terms entered in the online advertising platform to referral criteria that are associated with the product enrollment system.

4. The method of claim 1 wherein the one or more products for enrollment are one or more insurance products.

5. The method of claim 1 wherein the one or more products for enrollment are one or more services.

6. The method of claim 1 wherein the user interface in communication with the product enrollment system is via at least one type selected from the group consisting of: audio, phone, mobile device, tablet, app, SMS, chat, messaging service, videoconference, virtual reality game and game system.

7. The method of claim 1, wherein at least the portion of the information corresponding to application requirements that is communicated to the online advertising platform includes user demographics-related information.

\* \* \* \* \*